Oct. 27, 1964   H. S. DAVIS   3,154,090
SEQUENCING VALVE
Filed March 25, 1963
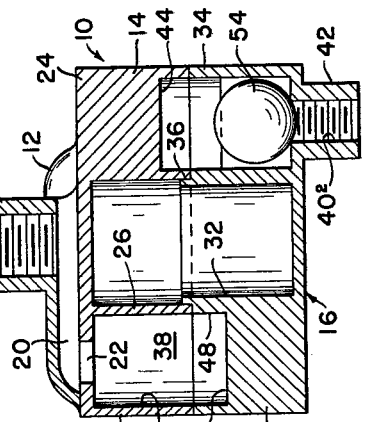
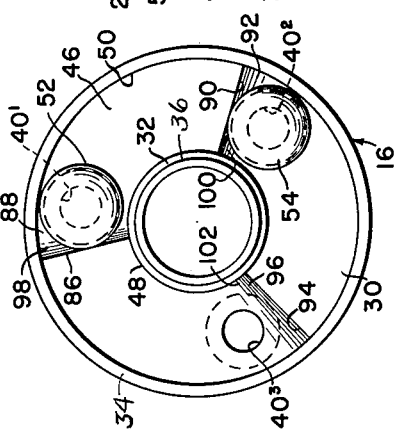
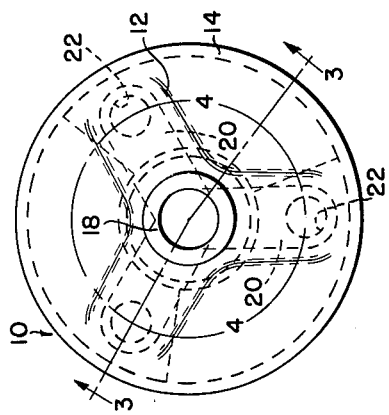
INVENTOR.
HARRY S. DAVIS
BY
Raymond W. Colton
ATTORNEY United States Patent Office 3,154,090
Patented Oct. 27, 1964

3,154,090
SEQUENCING VALVE
Harry S. Davis, Fort Lauderdale, Fla., assignor to Davis Flow Valve, Inc., Fort Lauderdale, Fla., a corporation of Florida
Filed Mar. 25, 1963, Ser. No. 267,696
6 Claims. (Cl. 137—119)

This invention relates to selectively operated distributing valves, and more specifically to a novel sequencing valve adapted to sequentially supply a liquid from a source to one or more of a plurality of outlets whence the liquid may be delivered to selected points.

While not limited thereto, this invention finds particular application in irrigation systems, wherein water delvered under pressure, as for example, from a pump or a city water main, is sequentially supplied to a series of branches each connected with a number of spray or sprinkler heads. Systems of this type are usually characterized by a connection with a source of water under pressure, which may be a pump delivering from a well, or a storage tank having sufficient elevation to provide the desired supply pressure, and a distributing valve system including a valve or valves operable to selectively deliver water to one of a number of branches, each branch delivering the water to a group of sprinkler or spray heads to irrigate a limited area. In most cases, the rate of water supply is limited, usually delivered by a 1" or 1½" diameter pipe, which is inadequate to simultaneously feed all of the sprinkler or spray heads of the irrigation system. Since each branch of an irrigation system requires water only a part of the time, which may vary from a few minutes to several hours, depending on the particular requirements of the installation, it has been customary to install a distributing system between the supply line and the several branch lines. Such distributing systems vary from a relatively simple arrangement comprising a number of T's in the supply line, each T including a valved connection with each branch, to a more complex arrangement including a rotary distributing valve. The several valves in the system having the T's may be selectively manually opened and closed, or may be remotely operated, as by a timer, through electrical connections with a solenoid or rotary motor actuated valve, or by hydraulic connections with a diaphragm or piston operated valve. Similarly, the rotary distributing valve may be manually moved, step-by-step, to sequentially supply the several branches, or the stepping movement of the rotary distributnig valve may be accomplished by a remotely positioned timer through electrical, mechanical, or hydraulic connections, or the rotary distributing valve may control the opening and closing of valves in the several branch lines by means of fluid actuated servomotors and the like.

Such prior are valve systems usually include metal parts and/or pivoted or sliding parts. The metal parts are susceptible to rusting and corrosion, unless made of certain alloys or are covered with suitable resistant coatings. Such alloys and coating add considerably to the cost of manufacture. Furthermore, the coatings are gradually worn or broken away, leaving the metal parts exposed. Rivoted and sliding connections must be kept lubricated and clean; otherwise the moving valve element may become frozen or jammed in an open or closed position.

It is an object of my invention to provide a novel sequencing valve which overcomes all of the above drawbacks.

It is a further object to provide a novel sequencing valve in which the only movable parts comprise one or more freely movable valves which are automatically moved, in response to the alternate cessation and initiation of the liquid supply to the sequencing valve, from a position obstructing flow through one outlet opening to a position obstructing flow through a next adjacent outlet opening.

It is a still further object to provide a novel sequencing valve in which the step-by-step sequencing action can be remotely controlled without the use of auxiliary connections between the control member and the sequencing valve.

It is a still further object to provide a novel sequencing valve construction which can adavantageously be economically and quickly manufactured from plastic materials by a process of injection molding.

It is a still further object to provide a novel sequencing valve which is substantially fool-proof in operation, which will not get out of order, and which presents no maintenance problems.

The attainment of the above objects and advantages, as well as additional objects and advantages, will become evident from a consideration of the following detailed description in conjunction with the accompanying drawings, in which:

FIG. 1 is a plan view of an embodiment of my sequencing valve adapted for a system having three branch lines;

FIG 2 is a plan view of the lower half or lower section of the sequencing valve shown in FIG. 1, illustrating the three outlets in the bottom wall;

FIG. 3 is transverse sectional view of the sequencing valve as seen along the plane 3—3 of FIG 1; and FIG. 4 is a developed sectional view of the sequencing valve taken through the annular flow passage as seen along the plane 4—4 of FIG. 1.

The present invention covers a novel embodiment of my invention. Reference is made to my copending application for a Sequencing Valve, Serial No. 239,226, filed in the U.S. Patent Office on November 21, 1962, which discloses and claims other modifications.

The sequencing valve of the present invention is characterized by a housing defining an endless flow passage, preferably annular in form, having at least two inlets in the upper part of the flow passage and an equal number of outlets in the lower part of the flow passage. One or more ball valves, each having a diameter larger than that of the outlets, are adapted to be swept by the flow of liquid passing through the flow passage into a position obstructing flow through an outlet or outlets. The ball valve or valves are made of a material having a density slightly less than the density of the liquid flowing through the housing. The number of ball valves is at least one less than the number of outlets, so that at least one outlet is always open to permit unobstructed flow of liquid from the endless flow passage to at least one of the branch lines connected with the outlets. So long as the supply pressure to the valve housing is maintained, the ball valve or valves will be held against the seat or seats provided by the outlets which they engage to obstruct flow from such outlet or outlets, while outflow is permitted through the unobstructed outlet or outlets to its or their respective connected flow line. When the liquid supply pressure to the valve is discontinued, the pressure maintaining the ball valve or valves on its or their seats is no longer effective, and the ball valve or valves will float to the upper part of the flow passage and out of register with the outlets. The upper wall or ceiling of the flow passage, and the bottom wall or floor of the flow passage, are provided with inclined walls to form a pair of camming surfaces which are contoured to advance the ball valve or valves in the same circumferential direction, step-by-step, from one outlet to the next succeeding outlet. It becomes possible, therefore, to remotely control the sequencing action by the simple expediency of discontinuing and initiating the supply of liquid to the sequencing valve by means of a shut-off valve or a pump in the supply line to the sequencing valve, upstream of the sequencing valve, requiring no additional connection between the control member and the sequencing valve to provide the step-by-step sequencing operation as is common in the prior art devices.

It is evident that two, three, four or more outlets can be provided, and that the number of ball valves can be one or more less than the number of outlets. Thus, if it is desired that liquid be discharged from only one outlet at a time, the number of ball valves provided will be one less than the number of outlets. On the other hand, if it is desired that liquid be discharged simultaneoulsy from two outlets, the number of ball valves provided will be two less than the number of outlets, and so on. By simply adding or removing a ball valves provided will be two less than the number of outlets, and so on. By simply adding or removing a ball valve from a sequencing valve system having a number of outlets, it is possible to quickly change the operation to vary the number of outlets which simultaneously discharge liquid.

It is also evident that the sequencing valve of my invention is not limited in use to an irrigation system, but can find application in many other fields where a sequencing operation is desired. Nonlimiting examples are (1) distribution of oil from a producing well to several storage tanks; (2) distribution of oil from a storage tank to a number of tank cars or to oil receiving chambers in the hold of a tanker; (3) distribution of sewage to a series of settling, aerating, or treating tanks, and etc.

Referring to the accompanying drawings, the sequencing valve is designated in its entirety by the reference numeral 10 and comprises an inlet manifold section 12, an upper section 14, and a lower section 16, which can be made from suitable plastic material by a process of injection molding.

The inlet manifold section 12 comprises a central, axially extending, threaded inlet nipple 18 having three radiating branches 20 terminating in a series of uniformly spaced axially directed inlet ports 22.

The upper section 14 comprises a base 24, preferably circular in section, from which extends a circular inner sleeve 26 and a circular outer sleve 28. The sleeves 26 and 28 are disposed in concentric, spaced, relation and are preferably of the same length.

The lower section 16 comprises a base 30, preferably circular in section, from which extend an inner sleeve 32 and an outer sleeve 34. The sleeves 32 and 34 are disposed in spaced, concentric relation, having substantially the same diameters as the sleeves 26 and 28, respectively, the sleeve 32 being slightly longer than the sleeve 34. As shown in FIG. 3, the sleeve 32 is thicker than the sleeve 26, and the upper end of the sleeve 32 is rabbeted at 36 to receive the lower end of the sleeve 26 to serve as a guide in assembly.

The three sections 12, 14 and 16 are assembled as shown, and the mating surfaces are united by fusing or by cementing to form a unitary structure, after the ball valves, described below, have been inserted. When so assembled, the bases 24 and 30, in conjunction with the sleeves 26, 28, 32 and 34, define an endless, annular, flow passage 38, which receives liquid from the spaced inlet ports 22 in the upper part thereof.

The lower part of the flow passage 38 includes a series of spaced, axially directed outlets $40^1$, $40^2$ and $40^3$, each connected with a threaded nipple 42 adapted to receive a branch flow line. While the outlets $40^1$, $40^2$ and $40^3$ are shown as extending axially from the base 30, it is evident that they can be disposed in the outer sleeve 34 to discharge in a radially outward direction.

It is also evident that the nipples 42 can include an elbow to discharge in radial directions.

The annular endless flow passage 38 is defined by a contoured ceiling or upper wall 44, a contoured floor or bottom wall 46, an inner side wall 48, and an outer side wall 50. A pair of ball valves 52 and 54, within the flow passage 38, are freely movable to sequentially move, in step-by-step action, from a position in obstructing relation with a pair of outlets to a floating position out of register with the outlets, and thence to a position in obstructing relation with the next adjacent outlets, all in response to the alternate cessation and initiation of flow through the sequencing valve by the operation of a control valve or pump (not shown) upstream of the sequencing valve as will be described in greater detail hereinafter.

The upper wall 44 is contoured by three inclined surfaces 56, 58 and 60, all sloping in the same circumferential direction. The adjoining inclined surfaces are interconnected by connecting surface means as follows: a substantially vertical surface 62 and a substantially horizontal surface 64 interconnect the highest point of the inclined surface 60 with the lowest point of the inclined surface 56; a substantially vertical surface 66 and a substantially horizontal surface 68 interconnect the lowest point of the inclined surface 58 with the highest point of the inclined surface 56; and a substantially vertical surface 70 and a substantially horizontal surface 72 interconnect the lowest point of the inclined surface 60 with the highest point of the inclined surface 58. The connecting surface means 62 and 64, 66 and 68, and 70 and 72, form the niches 74, 76 and 78, respectively. It will be noted that the inlet ports 22 are disposed in the niches 74, 76 and 78.

The bottom wall 46 is similarly contoured by three inclined surfaces 80, 82 and 84, all sloping in the same circumferential direction. The adjoining inclined surfaces are interconnected by a series of connecting surface means, as follows: a substantially vertical surface 86 and a substantially horizontal surface 88 interconnect the lowest point of the inclined surface 84 with the highest point of the inclined surface 80; a substantially vertical surface 90 and a substantially horizontal surface 92 interconnect the lowest point of the inclined surface 80 with the highest point of the inclined surface 82; and a substantially vertical surface 94 and a substantially horizontal surface 96 interconnect the lowest point of the inclined surface 82 with the highest point of the inclined surface 84. The connecting surface means 86 and 88, 90 and 92, and 94 and 96, provide a series of uniformly spaced niches 98, 100 and 102, respectively, at the bottom of which are located the outlets $40^1$, $40^2$ and $40^3$. As pointed out above, the outlets $40^1$, $40^2$ and $40^3$ could, if desired, be located in the side walls of the niches to discharge the liquid in a radially outward direction.

It is evident, from the foregoing description, that the inclined surfaces 56, 58 and 60 in the upper wall, and the inclined surfaces 80, 82 and 84 in the bottom wall, slope in opposite directions, and form camming surfaces which move the ball valves 52 and 54 in the same circumferential direction, or, as seen in FIG. 4, from the left toward the right, in response to alternate initiation and cessation of liquid flow through the sequencing valve through the operation of a pump or a control valve upstream of the sequencing valve, as set out more fully hereinafter. The substantially vertical interconnecting surfaces 62, 66, 70, 86, 90 and 94 of the niches 74, 76, 78, 98, 100 and 102, respectively, form stops to give the desired step-by-step operation of the ball valves.

The operation is as follows: FIG. 4 illustrates one of the operating positions of the two ball valves 52 and 54, which register with the outlets $40^1$ and $40^2$, respectively, obstructing flow through these two outlets. The control valve or pump (not shown), upstream of the sequencing valve 10, is operative to permit flow of liquid through the endless flow passage 38. Although the ball valves 52 and 54 have a density slightly less than the density of the liquid flowing through the sequencing valve, the pressure of the water delivered is sufficient to maintain the ball valves 52 and 54 on the seats of the outlets $40^1$ and $40^2$ to obstruct flow of liquid through these outlets, while liquid flows through the unobstructed outlet $40^3$ and through the branch line connecting with its nipple 42.

To obtain the desired step-by-step movement of the ball valves, the supply of liquid to the sequencing valve is cut off either by closing the control valve or by deactivating the pump upstream of the sequencing valve. The pressure within the flow passage 38 drops, whereupon the ball valves 52 and 54 float upwardly through the liquid remaining in the flow passage. The ball valve 52 engages the inclined surface 56 and is cammed up the incline toward the right into the niche 76, where its movement toward the right is arrested by the vertical surface 66. Similarly, the ball valve 54 engages the inclined surface 58 and is cammed up the incline toward the right into the niche 78, where its movement is arrested by the vertical surface 70. It is immaterial whether or not the ball valves 52 and 54, while floating within the niches 76 and 78, respectively, are in register with the inlet ports 22 therein. When flow through the sequencing valve is initiated by opening of the control valve or by energizing the pump upstream of the sequencing valve, the liquid from the inlet manifold 12 will enter the flow passage 38 through the three inlet ports 22 in downwardly directed jets, which action will be effective to sweep the ball valves 52 and 54 from the niches 76 and 78, respectively, toward the niches 100 and 102, respectively, to obstruct the flow of liquid from the outlets $40^2$ and $40^3$, while outflow takes place through the unobstructed outlet $40^1$. As the ball valves 52 and 54 are swept downwardly by the jets emitting from the outlet ports 22, they engage the inclined surfaces 80 and 82, respectively, which cam the ball valves toward the right and into the niches 100 and 102, respectively, to obstruct flow through the outlets $40^2$ and $40^3$. The pressure of the liquid within the flow passage 38 is sufficient to maintain the ball valves 52 and 54 in register with the outlets $40^2$ and $40^3$, respectively, so long as liquid under pressure is delivered to the sequencing valve 10.

It will be noted that the niches 74, 76 and 78 are circumferentially offset relative to the niches 98, 100 and 102, respectively, so that the niches 74, 76 and 78 overlie the inclined surfaces 84, 80 and 82, respectively, and the inclined surfaces 56, 58 and 60 overlie the niches 98, 100 and 102, respectively.

The sequencing valve 10 may be positioned above the ground or below the ground. When there is no flow through the flow pasage 38, the flow passage may remain filled with liquid or may be empty. If the flow passage remains filled with liquid, the ball valves will float in the upper niches. If the flow passage gradually empties as the result of flow through the outlets $40^1$, $40^2$ and $40^3$, the ball valves 52 and 54 will be cammed, as the liquid level recedes, by the inclined surfaces 80 and 82, respectively, toward their next blocking position with reference to the outlets $40^2$ and $40^3$.

When the control valve or the pump upstream of the sequencing valve 10 is deactivated, the pressure within the flow passage 38 drops, whereby the ball valves 52 and 54 float upwardly through the liquid, engaging the inclined surfaces 58 and 60, respectively, to be cammed into the niches 78 and 74, respectively. When flow through the sequencing valve is again initiated, the jets from the inlet ports 22 will sweep the ball valves 52 and 54 from the niches 78 and 74 downwardly against the inclined surfaces 82 and 84, respectively, whence they will be cammed to the right into the niches 102 and 98 and into register with the outlets $40^3$ and $40^1$, respectively. Pressure of the liquid within the flow passage 38 retains the ball valves 52 and 54 on the seats provided by the outlets $40^3$ and $40^1$.

Closing of the control valve or deactivation of the pump upstream of the sequencing valve results in a decrease in pressure in the flow passage 38, whereupon the valves 52 and 54 float upwardly out of register with the outlets $40^3$ and $40^1$, striking the inclined surfaces 60 and 56 whence they are cammed into the niches 74 and 76. When liquid flow is again initiated, the jets from the inlet ports 22 carry the ball valves 52 and 54 downwardly against the inclined surfaces 84 and 80, from where they are cammed into the niches 98 and 100 into register with the outlets $40^1$ and $40^2$ as shown in FIG. 4, completing a cycle.

It is evident that the sequencing valve can have only two outlets and a single ball valve, or that more than three outlets can be provided. The number of ball valves should be at least one less than the number of outlets to be controlled. If it is desired to feed liquid to two outlets simultaneously, the number of ball valves should be two less than the number of outlets, and so forth.

From the foregoing, it is seen that I have invented a very simple sequencing valve, in which the only moving part or parts are ball valves which are freely movable within the flow passage, and which are moved from one valving position to another valving position in response to the operation of a control valve or pump in the supply line upstream of the sequencing valve, requiring no auxiliary connections of any kind between the control member and the sequencing valve. All of the parts, including the ball valves, can be made of plastic materials by extrusion molding. The ball valves may be solid or hollow.

It will be understood that various changes may be made in the details of construction and in the arrangement of the parts of the sequencing valve disclosed herein, without departing from the principles of the invention and the scope of the annexed claims.

I claim:

1. A sequencing valve, comprising: a housing having upper, lower and side walls defining an endless flow passage; liquid inlet means in the upper part of said flow passage; a plurality of outlets in the lower part of said flow passage; ball valve means, at least one less than the number of outlets, freely movable in said flow passage, said ball valve means having a density slightly less than the density of the liquid to be controlled; the upper and lower walls of said flow passage each having a series of inclined surfaces, wall means, providing niches, connecting the high point of an inclined surface with the low point of an adjacent inclined surface, said liquid inlet means being positioned in the niches in the upper wall and said outlets being positioned in the niches in the lower wall, said niches in the upper wall being circumferentially offset relative to said niches in the lower wall, the inclined surfaces in the upper wall sloping in an opposite direction in relation to the inclined surfaces in the lower wall, whereby, upon initiation of liquid flow through said inlet means, a jet of liquid will impinge upon each ball valve means and force it downwardly into engagement with an inclined surface on the lower wall to be cammed to an adjacent niche and into a position to close the outlet to prevent flow therethrough, and when flow to said valve is discontinued, each ball valve means will float to a superimposed inclined surface on the upper wall to be cammed to a next succeeding niche in said upper wall adjacent an inlet means therein, so that when liquid flow is again initiated, each ball valve means will be forced downwardly against an inclined surface on the lower wall to be cammed to an adjacent niche and outlet therein in a manner previously described, each ball valve means progressing in a single direction through said flow passage.

2. A sequencing valve as defined in claim 1, in which said endless flow passage is annular in form.

3. A sequencing valve as defined in claim 1, in which said outlets include axially directed ports.

4. A sequencing valve as defined in claim 1, in which said outlets are disposed in the bottom wall of said flow passage.

5. A sequencing valve as defined in claim 1, in which said wall means providing niches include substantially vertical surfaces serving as stops for the ball valve means when in said niches.

6. A sequencing valve as defined in claim 1, in which said wall means providing niches include substantially vertical surfaces serving as stops for the ball valve means when in said niches, and substantially horizontal surfaces, said outlets and inlet means being disposed in said substantially horizontal surfaces.

No references cited.

UNITED STATES PATENT OFFICE
CERTIFICATE OF CORRECTION

Patent No. 3,154,090                                            October 27, 1964

Harry S. Davis

It is hereby certified that error appears in the above numbered patent requiring correction and that the said Letters Patent should read as corrected below.

Column 3, lines 19 to 21, strike out "By simply adding or removing a ball valves provided will be two less than the number of outlets, and so on."

Signed and sealed this 23rd day of March 1965.

(SEAL)
Attest:

ERNEST W. SWIDER                                        EDWARD J. BRENNER
Attesting Officer                                          Commissioner of Patents